May 14, 1935.　　　　M. H. TUFT　　　2,001,003
PLANTER AND FERTILIZER DISTRIBUTOR
Filed Jan. 16, 1933
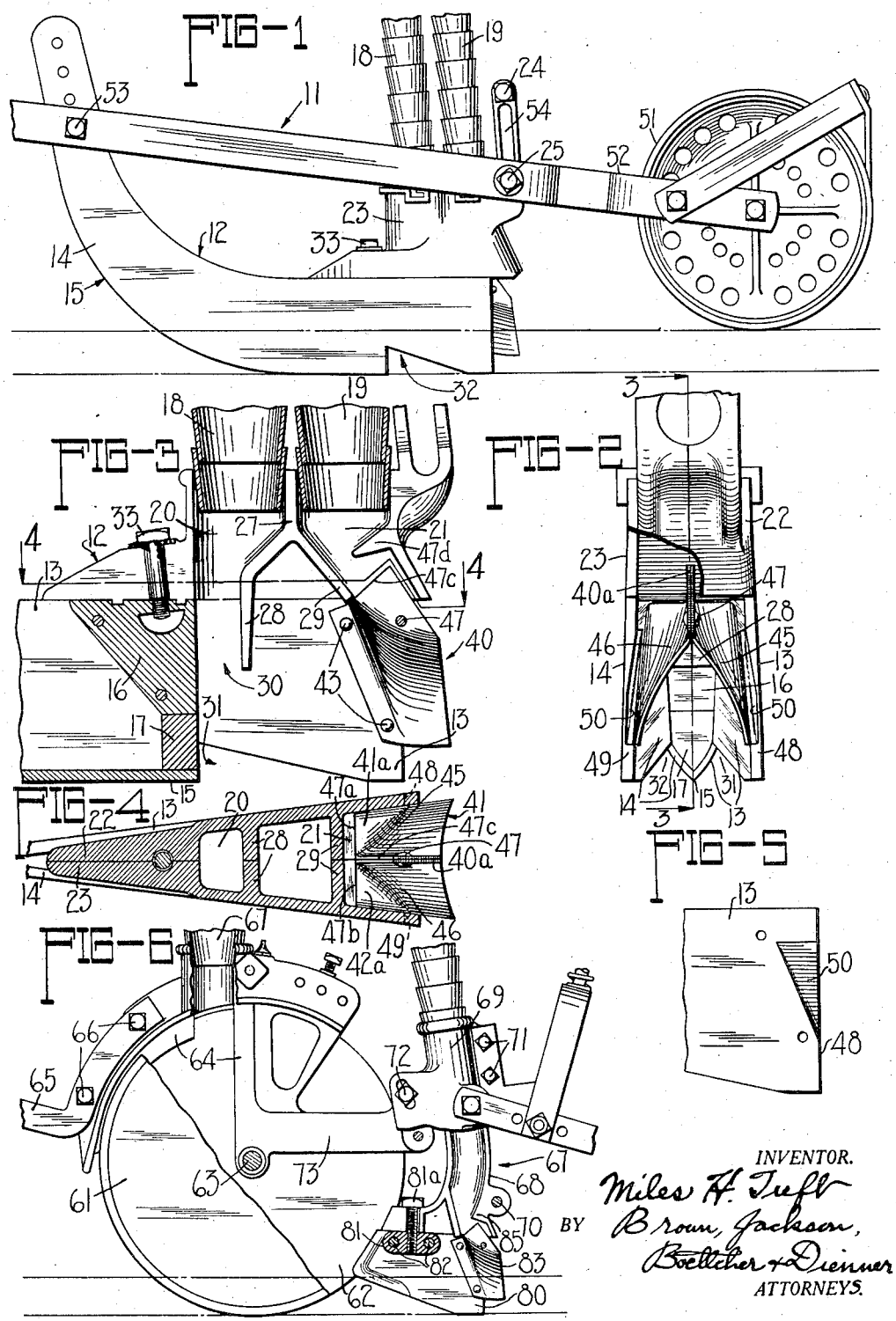
INVENTOR.
Miles H. Tuft
BY Brown, Jackson,
Boettcher + Dienner
ATTORNEYS.

Patented May 14, 1935

2,001,003

UNITED STATES PATENT OFFICE 2,001,003

PLANTER AND FERTILIZER DISTRIBUTOR

Miles H. Tuft, Rock Island, Ill., assignor to Deere & Company, Moline, Ill., a corporation of Illinois Application January 16, 1933, Serial No. 651,916

13 Claims. (Cl. 111—73)

The present invention relates to combined planters and fertilizer distributors in which the fertilizer is distributed during the planting operation, as by depositing the fertilizer in a furrow in the seed bed in proximity to the seed.

In distributing fertilizer in this manner, it is desirable that the fertilizer be embedded in the soil in close proximity to the seed, so that it will be of maximum benefit in supplying its nourishing properties to the seed and to the growing plant, but at the same time no appreciable quantity of fertilizer should be allowed to come into direct contact with the seed, as such has a tendency to detrimentally affect the germination of the seed and the growth of the plant. Such effect is commonly referred to as "firing" of the seed, and should be avoided in practically all planting operations.

In prior fertilizer distributors of the type to which this invention relates, in order to deposit the majority of the fertilizer in the furrow on opposite sides of the seed dropped therein, it has been customary to interpose a deflector midway between the two runners of the furrow opener below the fertilizer delivery tube, which deflector acts to deflect the bulk of the fertilizer to opposite sides of the furrow. In prior constructions, such as that above mentioned, it has been necessary to space the furrow opening runners relatively far apart to provide sufficient space between the sides of the deflector and the inner walls of the runners to allow the fertilizer to pass therebetween, and inasmuch as the fertilizer at times is lumpy, these distances between the deflector and the runners must be sufficient to pass the largest lumps in order to prevent clogging. However, while such constructions as above referred to operate satisfactorily when planting most crops, under certain conditions it might be considered undesirable to have to open such a comparatively wide furrow especially when planting certain crops, such as beets or beans, for the reason that such crops are sometimes planted in heavy soils and the increased power necessary to open the wider furrow becomes a factor to be considered.

With the above in view, therefore, it is the principal object of the present invention to provide an improved fertilizer distributor element or deflector adapted to be interposed between the furrow opening runners of a planter, by the use of which said runners may be spaced close together to form a relatively narrow furrow.

Another object of the invention is to provide a fertilizer distributor element or deflector adapted to be interposed between the furrow opening runners and to form with said runners troughs for conducting the fertilizer down to the sides of the furrow wall formed by such furrow opening runners.

A further object of the invention is to provide such a deflector which is adapted to be interposed between the furrow opening runners adjacent the rear edges of the runners, whereby the troughs formed by the deflector and the sides of the runners conduct the fertilizer to the rear edges of the runners and against the side of the furrow opened thereby.

A still further object of the invention is to provide such a deflector which is adapted for use with a fertilizer attachment adapted to be connected with a planter of the disc opener type.

Other objects and advantageous features will be apparent from the following description of my invention taken in connection with the accompanying drawing, in which:

Figure 1 is a side elevational view of a planter boot in which my present invention is incorporated, and showing also the customary covering wheel associated therewith;

Figure 2 is a view of the rear end of the planter boot showing the fertilizer deflector in position therein;

Figure 3 is a vertical longitudinal cross sectional view taken on the line 3—3 of Figure 2;

Figure 4 is a horizontal longitudinal cross sectional view taken on the line 4—4 of Figure 3, and illustrating the fertilizer deflector in plan;

Figure 5 is a fragmentary view illustrating the cut-away portion of the inner surface of one of the furrow-forming runners which forms a part of the fertilizer delivering trough; and Figure 6 is a side elevational view, partly broken away and partly in section, illustrating my present invention incorporated in an attachment for a disc furrow opener.

Referring to the drawing, only such parts of a combined planter and fertilizer distributor are illustrated therein as are necessary to an understanding of the present invention.

In Figures 1 to 5 of the drawing the fertilizer distributor has been shown as an integral part of the planter boot, and as illustrated in Figure 1 said boot is indicated as an entirety by the reference numeral 11. Said boot includes a runner 12 comprising side members 13 and 14 welded together along their front lower edge, as indicated at 15 in Figure 1, the top edges of said members diverging rearwardly, as is usual in planter boots. Adjacent their rear ends said members 13 and 14 are connected together by means of a spacing block 16 and a triangular-shaped filler block 17 (see Figures 2 and 3).

The seed and fertilizer are fed down to the planter boot through tubes 18 and 19, respectively, which lead into passages 20 and 21, respectively, formed in two similar castings 22 and 23 placed in juxtaposition, as best shown in Figure 4, said castings being secured together by means of bolts 24 and 25 (see Figure 1). The passages 20 and 21 are formed by members 27 in the form of inverted Y-shaped division walls, preferably formed integral with the castings. The arms 28 and 29 of said members extend down between the side members 13 and 14 of the runner 12 as shown in Figure 3. The castings 22 and 23 are also further secured together at their lower portions by the side members 13 and 14 of the runner 12, as will be readily understood.

As shown in Figure 3, the arms 28 of the Y-shaped members 27 extend downwardly substantially parallel to the rear wall of the spacing block 16 and filler block 17 to form a somewhat constricted outlet 30 for the seeds delivered by the seed tube 18. By reason of this construction the seeds are caused to be deposited on the ground directly back of the filler block 17.

The side members 13 and 14 of the runner 12 are notched out near their rear ends adjacent the rear margin of the filler block 17, as shown at 31 and 32 (Figures 3 and 1), to provide an opening for allowing loose, fine soil to seep through and cover the seeds directly after they have been deposited on the ground, primarily to eliminate the possibility of any fertilizer particles coming into direct contact with the seeds.

As shown in Figure 3, suitable bolt means 33 is provided for clamping the castings 22 and 23 to the spacing block 16 of the runner 12. The side members 13 and 14 of the runner 12 are extended rearwardly from the spacing block 16, said two members being separated at this point to form the furrow openers for widening the furrow to receive the fertilizer. At the rear ends of the side members 13 and 14 and positioned therebetween as shown, is a fertilizer deflecting member 40 which will now be described.

The deflecting member 40 comprises two sections 41 and 42, preferably formed of sheet metal, said members being respectively affixed to the inner faces of the side members 13 and 14 of the runner 12 by means of rivets 43, or in any other suitable manner. The two sections 41 and 42 are shaped to converge upwardly and are so positioned with respect to the side members 13 and 14 as to form downwardly and outwardly extending troughs 45 and 46, as shown in Figures 2 and 4. The upper ends of the sections 41 and 42 are brought into juxtaposition and are riveted together by means of a rivet 47, thereby forming a vertically extending dividing wall 40a positioned centrally of the two members 13 and 14 of the runner 12, as shown in Figure 2. This dividing wall 40a serves to divide the fertilizer fed down through the passage 21 into two streams, each stream being conducted down troughs 45 and 46, respectively. The arms 29 of the Y-shaped division walls 27 above described are inclined downwardly and rearwardly to meet the upper edges 47a and 47b of the sections 41 and 42, as shown in Figure 3. In order to insure the fertilizer falling against the upper edge 47c of the dividing wall, a forwardly extending deflecting wall 47d is provided in each casting 22 and 23, as shown in Figure 3. By this construction the possibility of any fertilizer striking the upper portion of the wall formed by the arms 29 and being deflected over the dividing wall and into the center of the furrow, is eliminated. Also, by providing such deflecting wall 47d the fertilizer material is forced to fall against the forward portion of the upper edge of the dividing wall 47c and into the forward portion of the troughs 45 and 46, thus eliminating the possibility of any appreciable amount of fertilizer falling from the rear midportions of the troughs and into the center of the furrow.

The shape of the deflector 40 and its position between the side members 13 and 14 of the runner 12 are such that the lower ends of the troughs 45 and 46 are adjacent the respective rear edges 48 and 49 of the side members 13 and 14 respectively and also the members 41 and 42 of the deflector extend somewhat to the rear of such rear edges 48 and 49. As a result, the fertilizer is fed against the furrow wall formed by the rear ends of the side members 13 and 14 just at the time the ends of such side members leave the newly formed furrow wall. Instantaneously with the rear ends of the members 13 and 14 leaving the furrow walls, such walls fold inwardly on top of the fertilizer that has been fed against them by the troughs 45 and 46. It will thus be seen that the furrow formed for receiving the fertilizer need only be as wide as the distance it is necessary to separate the two streams of fertilizer to prevent them coming too close to the planted seeds.

While I have shown and described the members 41 and 42 of the deflector as being riveted to the side members 13 and 14, it is to be understood that my invention is not to be limited to such construction as it would come within the scope of the present invention to have the members 41 and 42 merely abut against the inner faces of the side members 13 and 14 and be supported therebetween in any suitable manner.

In order to increase the width of the forward portions of the troughs formed by the members 41 and 42 of the deflector and the side members 13 and 14 of the runner, the ends of such side members have been ground out or cut away, as shown at 50 in Figure 5, along the meeting lines between the faces 41a and 42a of the sections 41 and 42 and the side members 13 and 14. By thus increasing the width of the troughs by grinding out the ends of the side members as described and making the sections 41 and 42 of sufficient width that they extend rearwardly some distance in rear of the rear ends of the side members 13 and 14, the possibility of fertilizer falling into the center of the furrow and in close proximity to the seed is eliminated.

After the fertilizer has been desposited, the soil which folds over on top of it is packed down by means of the usual pressing wheel or roller 51, journaled between a pair of arms 52 connected to the front end of the boot 11 by means of a bolt 53 and also connected to the castings 22 and 23 by means of the bolt 25 previously mentioned. The bolt 25 is disposed in aligned slots 54 formed in the castings 22 and 23, see Figures 1 and 3, through which the vertical position of the pressing wheel 51, with respect to the runner 12, may be adjusted, as will be readily understood.

Figure 6 illustrates a modified form of the invention incorporated in an attachment for a planter of the disc opener type. In this construction the furrow opener comprises two discs 61 and 62 which are journaled on an axle 63 supported from a standard 64. The standard 64 is, in turn, connected to a draft bar 65 by means of bolts 66, as is usual in such constructions. The seed is feed down through a tube 67, the lower end of which is suitably connected with the standard 64 in alignment with an opening in the standard, such opening being positioned between the discs and forward of the axle 63, whereby the seed delivered by the tube falls in the furrow between the discs ahead of the axle. In this construction the fertilizer attachment is in the form of a suitable casting 67 comprising two half-sections 68 and 69 bolted together by means of bolts 70, 71 and 72. Extending rearwardly from the standard 64 between the discs 61 and 62 is an arm 73 on the rear end of which the casting is supported by means of the bolt 72. The bolt 72 extends through aligned slots in the castings 68 and 69, as shown, thus making the position of the attachment adjustable relative to its support, as will be readily understood.

In this modified construction the furrow in which the fertilizer is deposited is formed by means of two runners 80, fixed together and held in spaced relationship by means of a spacing block 81 to which the runners are secured in any suitable manner, as by rivets 82. The spacing block is secured to the under side of the casting member 67 by means of a bolt 81a extending through the casting and threaded into the spacing block, as shown. At the rear end of the runners 80 a deflecting member 83 is provided, such member being identical with the deflector 40 above described. In this modified construction, also, the inner faces of the runners 80 have been ground out or cut away at their rear ends similarly to those of the runners 13 and 14, in order to increase the width of the forward portions of the troughs. In this construction the rear wall of the fertilizer delivery chute formed in the casting 67 curves forwardly, as at 85, at its lower end and extends down into close proximity to the deflecting member 83 for guiding the fertilizer to the extreme forward portions of the troughs and preventing any of the fertilizer from being deflected rearwardly over the member 83 and into the center of the furrow.

While in the construction shown in Figures 1 to 5 the fertilizer distributor of the present invention has been illustrated as an integral part of the planter boot, it is to be understood that such fertilizer distributor could readily be incorporated in an attachment to such a boot in a manner similar to that in which the fertilizer distributor attachment is connected to the planter boot in the application of Charles H. White, Serial No. 206,429, filed July 18, 1927, and the claims made herein are therefore to be construed accordingly.

I also wish it to be understood that while I have described the deflectors 14 and 83 as being formed of a sheet metal, they may be made in the form of suitable castings or of any material adapted for the purpose.

I claim:

1. A fertilizer distributor comprising a pair of runners for opening a furrow and a deflecting member positioned between said runners and formed to provide downwardly, rearwardly and outwardly diverging troughs the lower ends of which terminate substantially at the rear edges of the runners for guiding the fertilizer downwardly and rearwardly against the furrow walls formed by the runners and at a point directly back of the rear edges of the runners.

2. A fertilizer distributor comprising a pair of runners for opening a furrow and a deflecting member interposed between said runners and extending beyond the rear edges thereof, said deflecting member comprising downwardly, rearwardly and outwardly diverging troughs for separating the fertilizer into two streams and guiding the same downwardly and rearwardly against the two oppositely disposed furrow walls formed by the runners at points directly back of the rear edges of the runners.

3. In an implement of the class described, the combination of a furrow opener comprising a pair of runners adapted to open a seed furrow, a seed discharge duct adapted to discharge seed into said furrow, a fertilizer discharge duct in rear of said seed discharge duct adapted to discharge fertilizer into the furrow, and a deflecting member mounted between said runners for guiding the fertilizer downwardly and rearwardly against the two oppositely disposed furrow walls formed by the runners at points directly back of the rear edges of the runners.

4. A fertilizer distributor comprising a pair of runners for opening a furrow and a deflecting member interposed between said runners and abutting against the inner walls thereof to form therewith downwardly, rearwardly and outwardly diverging troughs the lower ends of which terminate substantially at the rear edges of the runners for guiding the fertilizer downwardly and rearwardly against the furrow walls formed by the runners at points directly back of the rear edges of the runners.

5. A fertilizer distributor comprising a pair of runners for opening a furrow and a deflecting member interposed between said runners and abutting against the inner walls thereof to form therewith troughs for guiding the fertilizer downwardly and rearwardly against the furrow walls formed by the runners at points directly back of the rear edges of the runners, the inner faces of said runners adjacent the abutting portions of said member being cut away to increase the width of the troughs.

6. A fertilizer distributor comprising a pair of runners for opening a furrow, and a deflector interposed between said runners, said deflector comprising two sections each having one of its edges abutting against the inner sides of the runners, the opposite edges being bent upwardly and inwardly into juxtaposition to form a dividing wall.

7. A fertilizer distributor comprising a pair of runners for opening a furrow, and a deflector interposed between said runners, said deflector comprising two members having their outer edges secured respectively adjacent the inner sides of said runners, the opposite edges of said members being curved upwardly and inwardly, said members at their upper ends being secured together in fixed parallel relationship and flaring downwardly and outwardly to bring their lower ends into substantial alignment with the inner walls respectively of said runners to form troughs, whereby the fertilizer is deposited by said troughs against the two oppositely disposed furrow walls formed by the runners.

8. A fertilizer distributor comprising a pair of runners for opening a furrow, and a deflector interposed between said runners, said deflector comprising two members having their outer edges secured respectively adjacent the inner sides of said runners, the opposite edges of said members being curved upwardly and inwardly, said members at their upper ends being secured together in fixed parallel relationship and flaring downwardly and outwardly to bring their lower ends into substantial alignment with the inner walls respectively of said runners to form troughs, whereby the fertilizer is deposited by said troughs against the two oppositely disposed furrow walls formed by the runners, the inner faces of said runners adjacent said members being cut away to increase the width of the troughs.

9. A fertilizer distributor comprising a pair of runners for opening a furrow, and a deflecting member interposed between said runners and extending beyond the rear edges of the runners, said deflecting member comprising downwardly, rearwardly and outwardly diverging troughs the lower ends of which terminate substantially at the rear edges of the runners for separating the stream of fertilizer into two streams and guiding the same downwardly, laterally and rearwardly against the two oppositely disposed furrow walls formed by the runners at points directly back of the rear edges of the runners.

10. A fertilizer distributor comprising a pair of runners for opening a furrow, and a deflecting member interposed between said runners for separating the stream of fertilizer into two streams and guiding the same downwardly, laterally and rearwardly against the two oppositely disposed furrow walls formed by the runners at points directly back of the rear edges of the runners, said deflecting member comprising two plates secured together for a portion of their length along one edge to form a dividing wall and being curved downwardly and outwardly to form a trough adjacent the inner wall of each runner.

11. A fertilizer distributor comprising a pair of runners for opening a furrow, and a deflecting member interposed between said runners for separating the stream of fertilizer into two streams and guiding the same downwardly, laterally and rearwardly against the two oppositely disposed furrow walls formed by the runners at points directly back of the rear edges of the runners, said deflecting member comprising two plates secured together for a portion of their length along one edge to form a dividing wall and being curved downwardly and outwardly to form a trough adjacent the inner wall of each runner, the inner wall of each runner adjacent each plate being cut away to increase the width of the trough.

12. A planter and fertilizer distributor boot comprising in combination, a pair of furrow opener runners, seed and fertilizer discharge passages between said runners, a deflector positioned between said runners below said fertilizer discharge passage and forming with the runners a pair of troughs for delivering fertilizer to the sides of the furrow formed by said runners, and a deflecting wall positioned above said deflector for deflecting the fertilizer toward the forward portion of the troughs and preventing the same from being deflected rearwardly over the deflector and into the center of the furrow.

13. A planter and fertilizer distributor boot comprising in combination, a pair of furrow opener runners, and a member positioned between said runners to form seed and fertilizer discharge passages, said member including a substantially inverted Y-shaped portion positioned between the seed and fertilizer passages whereby the seed will be deflected downwardly and forwardly and the fertilizer will be deflected downwardly and rearwardly between said runners.

MILES H. TUFT.